US 11,739,848 B2

(12) United States Patent
Newton

(10) Patent No.: US 11,739,848 B2
(45) Date of Patent: Aug. 29, 2023

(54) DOME VALVE ADJUSTABLE TOP PLATE

(71) Applicant: Schenck Process Europe GmbH, Darmstadt (DE)

(72) Inventor: Michael Newton, Edinburgh (GB)

(73) Assignee: Schenck Process Europe GmbH, Darmstadt (DE)

( * ) Notice: Subject to any disclaimer, the term of this patent is extended or adjusted under 35 U.S.C. 154(b) by 46 days.

(21) Appl. No.: 17/509,865

(22) Filed: Oct. 25, 2021

(65) Prior Publication Data
US 2022/0042607 A1    Feb. 10, 2022

Related U.S. Application Data

(63) Continuation of application No. PCT/EP2020/060117, filed on Apr. 9, 2020.

(30) Foreign Application Priority Data

Apr. 25, 2019 (GB) ..................................... 1905804

(51) Int. Cl.
*F16K 3/32* (2006.01)
*B65G 53/46* (2006.01)
(Continued)

(52) U.S. Cl.
CPC ............ *F16K 3/32* (2013.01); *B65G 53/4658* (2013.01); *F16K 3/243* (2013.01); *F16K 5/06* (2013.01);
(Continued)

(58) Field of Classification Search
CPC ... F16K 3/32; F16K 3/243; F16K 5/06; F16K 27/041; F16K 27/067; F16K 31/041; B65G 53/4658; B65G 2201/042
(Continued)

(56) References Cited

U.S. PATENT DOCUMENTS 430,484 A * 6/1890 Richards ................. F16K 3/243
251/324
4,074,889 A * 2/1978 Engel ...................... F16K 1/221
251/298
(Continued)

FOREIGN PATENT DOCUMENTS

CN     1033529660 A    10/2013
GB       1539079       1/1979
(Continued)

OTHER PUBLICATIONS

Indian Examination Report dated Mar. 11, 2022 in corresponding application 202137043003.

*Primary Examiner* — John Bastianelli
(74) *Attorney, Agent, or Firm* — Muncy, Geissler, Olds & Lowe, P.C.

(57) ABSTRACT

A valve with a valve upper plate defining an inlet, a valve body defining an outlet, and a fluid passage. A closure member is disposed in the fluid passage between the inlet and the outlet and has a convex sealing surface and is rotatable between a closed position in which the closure member extends across the fluid passage with the convex sealing surface oriented towards the inlet and an open position in which fluid is able to flow through the fluid passage from the inlet to the outlet. A resilient sealing ring, when the closure member is in the closed position, is moveable between a first configuration in which the sealing ring forms a seal around a circumference of the convex sealing surface and a second configuration in which the valve comprises a circumferential gap between the convex sealing surface and the sealing ring.

15 Claims, 6 Drawing Sheets

(51) Int. Cl.
  *F16K 3/24* (2006.01)
  *F16K 27/04* (2006.01)
  *F16K 27/06* (2006.01)
  *F16K 5/06* (2006.01)
  *F16K 31/04* (2006.01)

(52) U.S. Cl.
  CPC .......... *F16K 27/041* (2013.01); *F16K 27/067* (2013.01); *B65G 2201/042* (2013.01); *F16K 31/041* (2013.01)

(58) Field of Classification Search
  USPC ........................................................ 251/301
  See application file for complete search history.

(56) References Cited

U.S. PATENT DOCUMENTS

| | | | | |
|---|---|---|---|---|
| 4,137,935 A | * | 2/1979 | Snowdon | ........... B65G 53/4658 |
| | | | | 251/298 |
| 4,519,579 A | * | 5/1985 | Brestel | ................... F16K 5/204 |
| | | | | 251/177 |
| 5,101,853 A | * | 4/1992 | Mailliet | .................. F16K 5/207 |
| | | | | 251/303 |
| 5,642,751 A | * | 7/1997 | Crawley | ............... F16K 49/007 |
| | | | | 137/340 |
| 6,050,289 A | | 4/2000 | Flores-Verdugo et al. | |
| 6,206,024 B1 | | 3/2001 | Naberhaus | |
| 6,213,450 B1 | * | 4/2001 | Palmer | .................... F16K 5/205 |
| | | | | 137/239 |
| 6,805,332 B2 | * | 10/2004 | Crawley | ................. F16K 5/205 |
| | | | | 251/249.5 |
| 9,079,145 B2 | * | 7/2015 | Baranowski | ............ B01J 8/003 |
| 2016/0258541 A1 | * | 9/2016 | Snowdon | ............... F16K 31/041 |

FOREIGN PATENT DOCUMENTS

| | | |
|---|---|---|
| WO | WO 97/35130 A2 | 9/1997 |
| WO | WO9735130 A2 | 9/1997 |

* cited by examiner

DOME VALVE ADJUSTABLE TOP PLATE

This nonprovisional application is a continuation of International Application No. PCT/EP2020/060117, which was filed on Apr. 9, 2020, and which claims priority to Great Britain Patent Application No. 1905804.9, which was filed in Great Britain on Apr. 25, 2019, and which are both herein incorporated by reference.

BACKGROUND OF THE INVENTION

Field of the Invention

The present invention relates to a valve and in particular to a valve for use in pneumatic conveying of particulate material.

Description of the Background Art

Pneumatic conveying by pressure or vacuum are techniques employed to transport particulate materials along a pipeline. These techniques are typically employed to transport materials over distances typically in the range from 10 m to 500 m, and in some cases even further. Pneumatic conveying avoids the need for the use of conveyor belts or the like, which can be bulky and costly to maintain.

Pneumatic conveying techniques are particularly useful where material must be transported along a complex path, or to multiple delivery points. These techniques also ensure that the particulate material can be entirely contained within a pipeline, which may avoid the need to deal with dust from or contamination of the material along the path of the conveying pipeline.

Pneumatic conveying, and other stages of material handling, may be conducted at an elevated pressure, or may use pressure differentials between different parts of a conveying or material handling facility. For example, dense phase positive pressure or vacuum pneumatic conveying is often used to transport dense phase particulates that are not suitable for conveying by suspension in a gas flow, such as materials prone to particulate breakage, or particularly abrasive or friable materials.

A conventional pressurized dense phase pneumatic conveying system includes a hopper, from which particulate material is delivered into a pressure vessel. The pressure vessel is typically pressurized with compressed air, and particulate material is delivered under pressure into a conveying pipeline. The pressurized air in the pressure vessel expands into the conveying pipeline and propels the particulate material along the pipeline to a delivery point at a lower (e.g. ambient) pressure.

The inlet valve between the pressure vessel and the conveying pipeline, or indeed any valve delivering a flow including particulate material across a pressure differential, must be capable of opening and closing in the presence of particulates and must have a suitable working lifetime.

GB1539079 (Macawber Engineering) describes an inlet valve for use with a vessel that contains pressurized powder. The valves described in GB1539079 are commonly referred to as "dome valves", are in common use today in particulate material processing, such as dense phase conveying, and process injection technology. A conventional dome valve is shown in FIGS. 1 and 2 and described in further detail below.

A dome valve includes a closure member with a convex sealing surface, typically defining a part of a spherical surface. When the valve is closed, the closure member blocks a channel extending through the valve.

A key aspect of the valve is its resilient/inflatable sealing member which is designed to avoid wear. This sealing member provides a non-contact clearance when the valve moves between the open and closed position, and provides a gas-tight seal when the valve is closed, even with powder contamination. The material passing through the valve determines the size of the non-contact clearance to be set. Particulate sizes of the material can vary from 1 µm to 200 mm in diameter.

The non-contact clearance, or seal gap, between the convex sealing surface of the dome and the inflatable seal is adjusted on prior art designs by using gasket shims between the valve body and the valve upper plate (N.B. the non-contact clearance is set when the inflatable seal is deflated). Adding gasket shims raises the top plate relative to the valve body, which increases the size of the circumferential seal gap, and reducing the number of gasket shims decreases the size of the circumferential seal gap. The gasket shim design can be seen in FIG. 3.

The process of setting the seal gap in the prior art is as follows:

With the closure member (dome) in the closed position, and the resilient/inflatable seal in the deflated configuration, feeler gauges are used to measure the seal gap between the dome and the inflatable seal. If the gap is too big the seal gap is reduced by removing gaskets. If the gap is too small the seal gap is increased by adding gaskets.

Therefore, the fasteners securing the valve upper plate have to be unfastened and removed. Then the valve upper plate has to be removed from the assembly. Afterwards the inflatable seal, intermediate plate and the insert ring have to be lifted out.

In this position the appropriate number of gasket shims can be added or removed to give the required seal gap. Afterwards the insert ring, intermediate plate, inflatable seal, and the valve upper plate have to be refitted and the seal gap has to be rechecked using feeler gauges.

All the mentioned steps have to be repeated as often as necessary until the required seal gap is achieved. Afterwards the upper plate can be fastened to the body with the upper plate fasteners.

Setting the seal gap in this manner is a time-consuming process and is also physically demanding on larger valves. Further to this, after valve maintenance the seal gap could be incorrectly set due to the lack of experience of the customers' maintenance engineers. A badly set seal gap could result in premature failure of the replacement inflatable sealing ring.

For the above reasons, there remains a need to address or mitigate at least one or more of the aforementioned problems.

SUMMARY OF THE INVENTION

It is therefore an object of the present invention to provide an improved valve for use in pneumatic conveying of particulate material.

According to a first example of the invention there is provided a valve comprising: a valve upper plate defining an inlet, a valve body defining an outlet, and a fluid passage extending between the inlet and the outlet. The valve further comprising: a closure member disposed in the fluid passage between the inlet and the outlet, having a convex sealing surface; wherein the closure member is rotatable between a closed position in which the closure member extends across the fluid passage with the convex sealing surface oriented towards the inlet; and an open position in which fluid is able to flow through the fluid passage from the inlet to the outlet; a resilient sealing ring extending around the fluid passage between the inlet and the outlet; and, when the closure member is in the closed position; wherein the sealing ring is attached to the valve upper plate, and is moveable between a first configuration in which the sealing ring forms a seal around a circumference of the convex sealing surface; and a second configuration in which the valve comprises a circumferential gap between the convex sealing surface and the sealing ring; and a plurality of adjustors; wherein the plurality of adjustors are capable of adjusting the size of the circumferential gap between the convex sealing surface and the sealing ring.

The sealing ring may be attached to the valve upper plate via an insert ring. The insert ring may be located between the valve upper plate and the sealing ring, and may be attached to the valve upper plate, the valve intermediate plate, or both.

The insert ring may be used to hold the sealing ring in place, and it may provide a chamber for the compressed gas to expand in, to inflate the seal. The insert ring may hold the seal concentrically in the upper plate.

The circumferential gap size may be adjusted by displacing the valve upper plate relative to the valve body. The plurality of movable adjustors may be adjusted to protrude onto the valve body with varying degrees, thereby increasing or decreasing the distance between the upper plate and the body.

The valve body may comprise a plurality of seats or plates to receive the movable adjustors to prevent wear on the valve body. The movable adjustors may be grub screws with, for example, a hexagonal head, adjustable with a key e.g. a hexagonal key. Alternatively, the movable adjustors may be screws which have slot heads, cross heads, Torx, or similar.

The plurality of movable adjustors may be capable of being adjusted without removing the upper plate. This allows the movable adjustors to be adjusted without any disassembling of the valve.

The sealing ring may be substantially annular or annular around a substantially longitudinal or longitudinal central axis of the valve. The swept profile of the sealing ring may be constant about the substantially longitudinal or longitudinal central axis. The longitudinal central axis is shown in FIGS. 5 and 6 (157) and runs through the straight line which would be formed if one were to intersect the center point of each of the circular geometries of the upper plate, the sealing ring, and the valve body.

At least in the region of the sealing ring, the fluid passage may be substantially symmetrical or symmetrical around the central axis. The sealing ring may be substantially circularly symmetric or may describe an oval symmetry. In some embodiments, when viewed down the axis, other symmetries may be possible, such as, for example, a square or rectangular symmetry (for example, wherein the sealing ring is saddle shaped).

The valve body may be substantially symmetrical or symmetrical around the central axis, at least in the portion defining the fluid passage in the region of the sealing ring and fluid-directing surface.

The fluid passage may extend along the central axis.

The closure member may be rotatable around an axis substantially perpendicular or perpendicular to the central axis. Usually the closure member is rotatable around a transverse axis substantially perpendicular to the longitudinal central axis of the valve. Rotation of the closure member may be achieved electromechanically, mechanically, of may be fluid-actuated (e.g. hydraulically or pneumatically). The valve may be a solenoid valve. The valve may be a pneumatic or a hydraulic valve.

The sealing ring may comprise a resilient material such as an elastomer. Resilient referring to the capability of a material to be deformed and return to its original shape. Any suitable resilient material may be used for the sealing ring, such as a fluoropolymer (e.g. Viton or PTFE) a polyurethane, a neoprene or a silicone material, a nitrile, a polypropylene (e.g. EPDM) or the like.

The closure member may be rotatable around a transverse axis substantially perpendicular or perpendicular to the substantially longitudinal or longitudinal central axis of the valve. The transverse axis is shown in FIGS. 5 and 6, with the reference numeral 156.

Rotation of the closure member may be achieved electromechanically, mechanically, of may be fluid-actuated (e.g. hydraulically or pneumatically). The valve may be a solenoid valve. The valve may be a pneumatic or a hydraulic valve.

When the closure member is in the closed position, the convex sealing surface may be oriented generally towards the inlet. When the closure member is in the open position, the closure member may be rotated by up to 90 degrees or more, such that the convex sealing surface is moved out of the fluid passage or as far to the side thereof as possible, so as to maximize flow area through the valve.

The convex sealing surface may be a part spherical surface (for example wherein the fluid passage in the region thereof is circularly symmetric) or may in alternative embodiments be a part ovoid surface, or a part cylindrical surface.

The sealing ring may comprise an inflatable portion. For example, a pressurisable volume may be defined between the sealing ring and the body. The inflatable component or pressurized volume may be pressurized and depressurised to facilitate movement of the sealing ring between the first and second configurations.

The valve upper plate may be attached to the valve body with a plurality of upper plate fasteners, and wherein the plurality of movable adjustors may be located inside the valve upper plate. The upper plate fasteners may be screws with a hexagonal head, adjustable with a hexagonal key. Alternatively, the fasteners may be screws which have slot heads, cross heads, Torx, or similar. The movable adjustors may be adjusted from within the valve upper plate to protrude onto the valve body, varying the distance between the valve upper plate and the valve body, thereby adjusting and/or defining the distance between the resilient sealing ring and the convex sealing surface.

The valve may further comprise an intermediate plate, located between the valve body and the valve upper plate, wherein the intermediate plate enables the upper plate to be removed without removing the sealing ring and insert ring. This is beneficial for inspecting the sealing ring, as the seal gap is not interfered with as it would be if there was no intermediate plate.

The valve upper plate may be attached to the intermediate plate with the plurality of upper plate fasteners, and the intermediate plate may be attached to the valve body with a plurality of valve body fasteners. Similar to the upper plate fasteners, the valve body fasteners may be screws with a hexagonal head, adjustable with a hexagonal key. Alternatively, the fasteners may be screws which have slot heads, cross heads, Torx, or similar. Both the upper plate fasteners and the valve body fasteners may be accessible through the valve upper plate, allowing the intermediate plate to be removed with the valve upper plate still attached to it.

The plurality of valve body fasteners may be orientated about the longitudinal axis in a substantially circular pattern. The substantially circular pattern may be orientated offset from the pattern of upper plate fasteners, to allow access to the valve body fasteners through the valve upper plate.

The valve upper plate, the intermediate plate, and the valve body all may have a substantially circularly centrally located symmetric hole, about the longitudinal central axis of the valve. The series of holes describe the fluid passage, may run from the inlet to the outlet of the valve.

The intermediate plate may comprise a plurality of seals, wherein at least one seal may be located between the intermediate plate and the valve upper plate, and at least one seal may be located between the intermediate plate and the valve body. The plurality of seals may be 'O-rings'. Alternatively, they may have other cross sections, including X shaped, square shaped, etc. The seals may prevent fluids and gases from escaping the fluid passage of the valve. The seals may be housed in seats between the components, which they are sealing. The seals may be made of any synthetic rubber or thermoplastic.

The circumferential gap size may be described as the shortest linear distance between the convex sealing surface and the sealing ring. The linear distance is in most cases normal to the convex sealing surface. If the convex sealing surface is spherically dome shaped and the line defining the gap size was extended into the dome, then it would pass through the center of curvature of the dome. Ideally, the gap size will be consistent around the circumference of the sealing ring, giving only one linear gap size. To achieve this, each part of the assembly must be adjusted by an equal distance along the longitudinal axis of the valve, by using the adjustors. If the movable adjustors are adjusted in a dissimilar manner, then the gap size may vary at different locations around the circumference of the sealing ring. The shortest linear distance may be orientated substantially perpendicular to the convex sealing surface and the sealing ring.

The circumferential gap size may be from 0 (direct contact) to 1.5 mm. The plurality of movable adjustors may be orientated substantially around the longitudinal axis in a circular pattern. The movable adjustors may be in a similar circular pattern as the fasteners described above, whilst maintaining a suitable offset to enable the movable adjustors to be accessed through the valve upper plate. If the intermediate plate is included in the assembly, then the upper plate fasteners, the body fasteners, and the movable adjustors are all accessible from the valve upper plate. This allows access to the fasteners and adjustors without removing the valve upper plate.

To adjust the circumferential gap size, the plurality of movable adjustors may be used to displace the valve upper plate relative to the valve body. This may be done in a similar fashion as when displacing the intermediate plate to the valve body. As previously mentioned, components may preferably be displaced perpendicular to each other, ideally along the longitudinal central axis.

The plurality of upper plate fasteners may be orientated about the longitudinal axis in a substantially circular pattern.

The closure member may be dome shaped. The plurality of movable adjustors may be accessible through the valve top plate.

In another aspect, the invention extends to a method of adjusting a circumferential gap between a convex sealing surface and a resilient sealing ring of a valve, the method comprising: providing a valve having a valve upper plate defining an inlet, a valve body defining an outlet, and a fluid passage extending between the inlet and the outlet, a closure member having a convex sealing surface disposed in the fluid passage between the inlet and the outlet, a resilient sealing ring extending around the fluid passage between the inlet and the outlet, and a plurality of adjustors; the closure member being in a closed position, and the sealing ring being in a deflated position, thereby creating a circumferential gap between the convex sealing surface and the sealing ring; and measuring the circumferential gap between the convex sealing surface and the sealing ring, to obtain a measurement of the circumferential gap; adjusting the plurality of adjustors to displace the upper plate from the valve body, thereby adjusting the size of the circumferential gap.

The method may comprise allowing the plurality of movable adjustors to be adjusted without removing the valve upper plate.

The method wherein the sealing ring may be annular around a longitudinal central axis of the valve.

The method, wherein before adjusting the plurality of movable adjustors, a plurality of upper plate fasteners may be loosened to allow the valve upper plate to be displaced from the valve body.

The method wherein the valve may further comprise an intermediate plate located between the valve body and the valve upper plate, which may allow the valve upper plate to be removed without removing the sealing ring from the valve body.

In another aspect, the invention extends to a kit of parts for a valve, comprising: a valve upper plate defining an inlet, suitable for housing a resilient sealing ring, and suitable for being attached onto a valve body; wherein the upper plate has a series of features arranged in a circular pattern to allow fasteners to be inserted into, to allow the valve upper plate to be attached to the valve body, and a series of features arranged in a circular pattern to allow a plurality of movable adjustors to be inserted into; wherein the valve comprises a valve body defining an outlet, a closure member disposed in a fluid passage between the inlet and the outlet, the closure member having a convex sealing surface, wherein the plurality of movable adjustors are capable of adjusting the size of a circumferential gap between the convex sealing surface and the sealing ring.

In a further aspect, the invention extends to a pressure vessel, having an outlet port coupled to the inlet of the valve of the first aspect. The valve may be coupled directly, or via a length of conduit or pipeline.

The pressure vessel may form part of a particulate material pneumatic system. The particulate material pneumatic system may, for example, be a particulate material conveying system, such as a dense phase conveying system, for transporting dense phase particulate materials such as sodium sulphate, sodium carbonate, sand, gypsum, alumina, metallurgical coke, clinker, metallic dust and concentrates, or other inorganic salts, catalyst substrates and the like. The particulate material pneumatic system may be used to convey fuels, such as coal, biomass or waste materials. The pressure vessel may for example be a transporter for a particulate material conveying apparatus.

The particulate material pneumatic system may be a batch feeding system, in which particulate material, such as the materials mentioned above, are dispensed in from a holding vessel in batches of a predetermined size. The particulate material system may be a lean phase conveying system (also known as "dilute phase" conveying, in which the ratio of conveying product to conveying gas, and typically also the conveying gas pressure, is lower than dense or medium phase pneumatic conveying).

The particulate material pneumatic system may be a gravimetric feeder, in which batch sizes are determined by monitoring weight changes in a portion of the apparatus. Typically, a gravimetric feeder comprises a holding vessel, and the batch sizes are determined by monitoring weight change of the holding vessel (and any ancillary apparatus that cannot be made independent e.g. by flexible conduits, of the holding vessel).

Further optional features disclosed in relation to each aspect of the invention correspond to further optional features of each other aspect of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
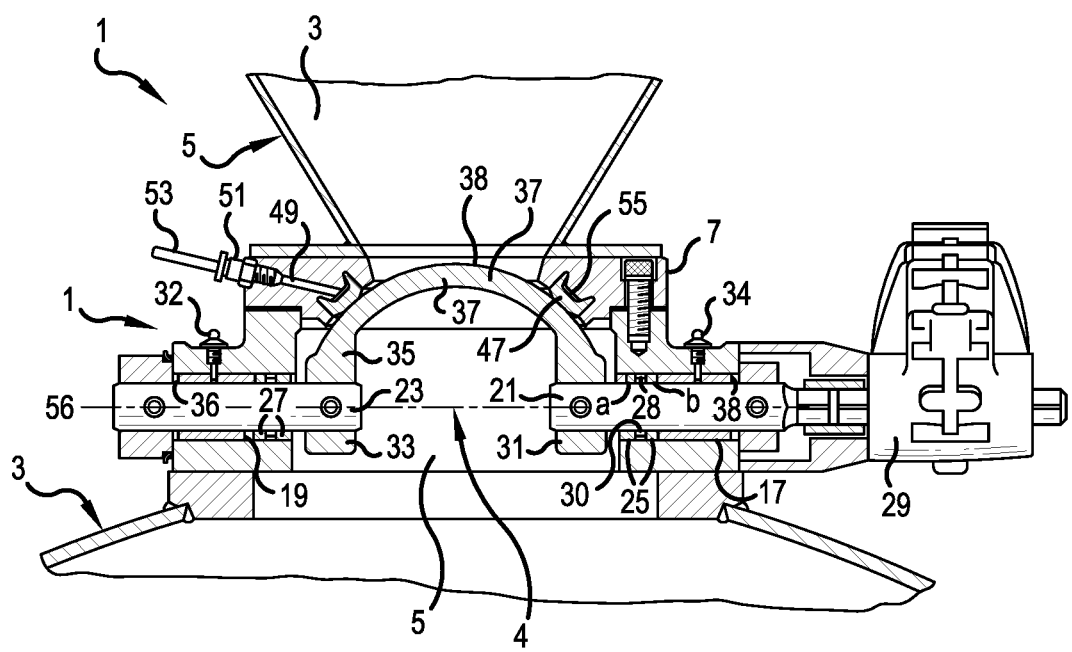
FIG. 1 is a cross-sectional elevation view of a dome valve.
Figure 2:
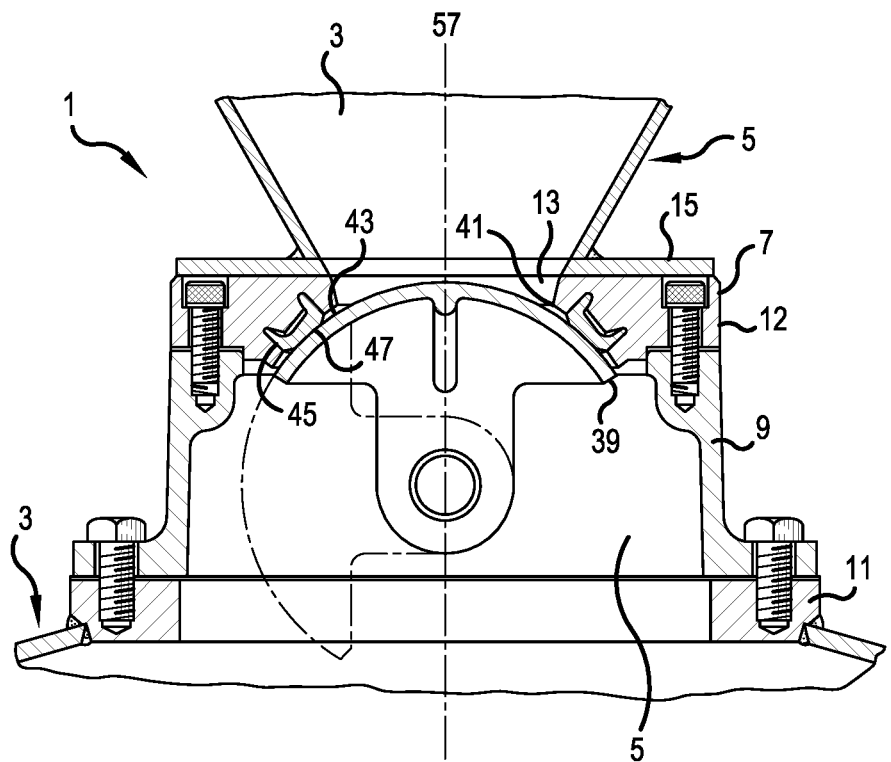
FIG. 2 is cross-sectional end elevation view of the valve in FIG. 1.
Figure 3:
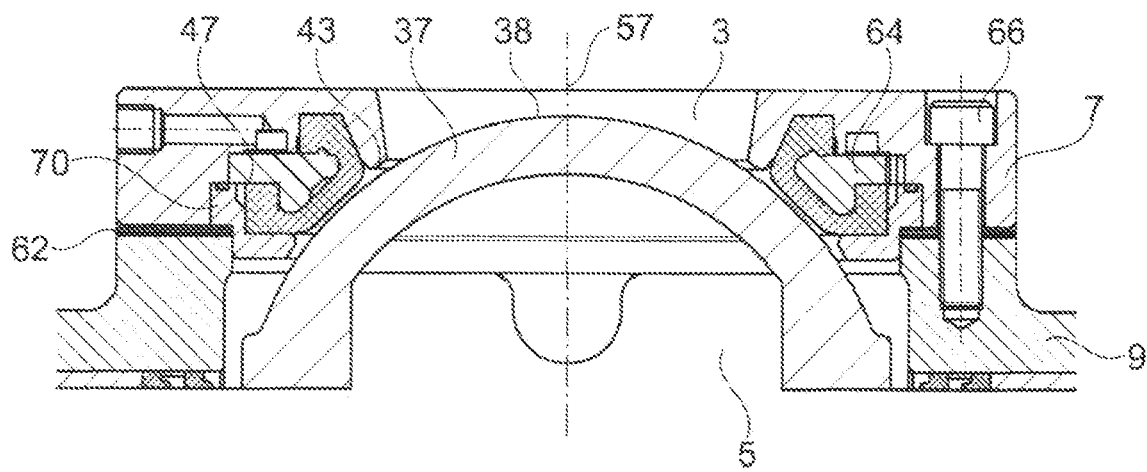
FIG. 3 is a cross-sectional elevation view of a valve, showing the valve upper plate, valve body, valve closure member, insert ring, sealing ring, valve upper plate fasteners and gasket shims.

FIGS. 1, 2 and 3 show cross sections of a dome valve 1, having an inlet 3 and an outlet 5 defined by a body or housing 9, and an upper plate 7. In use, the outlet is typically at a lower pressure than the inlet. The inlet may for example be connected to a pressure vessel, and the outlet to a conveying pipeline.

Particulate material may be delivered using a flow of carrier gas, for example air, from the inlet 3 to the outlet 5, via a fluid passage indicated generally as 4.

In the embodiment shown, the body 9 is bolted at its outlet end to a flange 11 at the inlet to a conveying pipeline. Other connections may be used, such as a tri-clover fitting or the like. At its inlet end, the body 9 is similarly coupled to the outlet of a pressure vessel or hopper.

As seen best in FIG. 1, the valve 1 includes diametrically opposite disposed bearing arrangements 17 and 19 around a drive shaft 21 and a pivot shaft 23 respectively.

Drive shaft 21 extends outwardly beyond bearing arrangement 17 to an external drive motor 29, by which the closure member 37 is rotated between opened and closed positions, in use.

The inward ends of drive shaft 21 and pivot shaft 23 are each attached to a respective downwardly depending portion 31, 33 of the closure member 37.

The closure member 37 includes a domed portion, which defines a convex sealing surface 38, oriented towards the inlet 3, when the closure member 37 is in the closed position as shown in FIG. 1.

Integral with portions 31 and 33 is a closure member 37, which has the shape of part of a spherical shell. The arrangement is such that the common axis of shafts 21 and 23 passes through the center of the spherical shell of which closure member 37 forms a part. Rotation of drive shaft 21 by means of motor 29, through an angle of approximately 90 degrees in this embodiment, causes closure member 37 to move from its closed position to its open position as shown by the dotted lines in FIG. 2, in which the closure member is moved out of the fluid passage 4 and fluid is able to flow through the fluid passage 4 from the inlet 3 to the outlet 5.

The valve comprises a longitudinal central axis 57, which runs down the center of the valve from the inlet 4 to the outlet 5. The valve further comprises a transverse axis 56, which is perpendicular and intersects with the longitudinal central axis 57. The closure member rotates about this transverse axis 56. The fluid passage, closure member 37 and sealing ring are circularly symmetric about the central axis 57. Accordingly, the sealing surface 38 is a part spherical surface. In alternative embodiments, as disclosed above, other geometries are used.

The valve 1 comprises an upper plate 7, which includes an annular surface 43, which is contoured to match the curvature of closure member 37. When the closure member 37 is in its closed position curved surface 43 lies closely adjacent the convex sealing surface 38. An annular recess 45 is formed in surface 43 and located in recess 45 is an inflatable sealing ring 47. The inflatable sealing ring 47 is bonded or otherwise coupled to the walls of recess 45 except at a central portion thereof, where a pressurisable volume, annular space 55 is defined between the sealing ring 47 and the body 9. The inflatable sealing ring 47 is made of a flexible and resilient hard-wearing material, such as an elastomer as disclosed herein. Extending through the inlet portion 12 of valve assembly 1 is a bore 49, which opens at one end into the annular space 55 and is connected at a connector 51 to a compressed air line 53.

When closure member 37 is in its closed position, the sealing ring 47 is moveable between a first configuration in which the sealing ring 47 forms a seal around a circumference of the convex sealing surface 38; and a second position in which the valve 1 comprises a circumferential seal gap 60 (visible in FIG. 8) between the convex sealing surface and the sealing ring. Such movement can be affected by pressurizing and depressurizing the annular space 55 defined between the sealing ring 47 and the body 7, via the bore 49. When the sealing ring 47 is in its second configuration, the valve can be opened by rotating the closure member 37 to its open position (dotted lines, FIG. 2). The circumferential gap between the sealing ring 47 and sealing surface 38 ensures that the closure member 37 does not slide against the sealing ring 47 during such rotation, which would otherwise contribute to wear on the relatively soft material of the sealing ring.

The resilient material of the sealing ring 47 is capable of conforming to the sealing surface 38 to form a seal even when small particles are trapped there between. Consequently, dome valves of this general type find use in the field of particulate material processing. It will be appreciated that, provided the air pressure in space 55 is greater than the pressure difference across the closure member 37, then a gas-tight seal will be maintained between the inlet 3 and outlet 5.

The circumferential seal gap 60 is checked and adjusted during the initial valve assembly and after any maintenance on the valve i.e. replacement of the inflatable seal 47. The seal gap 60 must be big enough to allow opening and closing of the closure member 37 without the possibility of debris catching and eroding the seal, and at the same time be small enough to ensure that when the seal is inflated there is an airtight connection made.

In FIG. 3, the valve further comprises an insert ring 64, which provides support for the resilient sealing ring 47 and keeps it in place. As described earlier, the gasket shim design is for adjusting the circumferential seal gap. Gasket shims 62 are used to adjust the distance between the valve upper plate 7 and the valve body 9; and since the sealing ring 47 is attached to the insert ring 64 and the valve upper plate 7, the distance between the sealing ring 47 and the sealing surface 38 of the closure member 37 is also adjusted. The method of adjusting the circumferential seal gap 60 is described below:

With the closure member 37 (dome) in the closed position, and the resilient/inflatable seal 47 in the deflated configuration, feeler gauges are used to measure the circumferential seal gap 60 between the closure member sealing surface 38 and the inflatable seal 47. If the gap is too big the seal gap 60 is reduced by removing gasket shims 62. If the gap is too small the seal gap 60 is increased by adding gasket shims 62. For this, the upper plate fasteners 66 securing the valve upper plate 7 to the valve body 9 have to be unfastened and removed. After this the valve upper plate 7 has to be removed from the assembly 1. Then the inflatable seal 47, intermediate plate 70, and the insert ring 64 have to be lifted out. An appropriate number of gasket shims 62 have to add out or to be removed to give the required seal gap 60. Afterward the insert ring 64, inflatable seal 47, intermediate plate 70, and the valve upper plate 7 have to be refitted. Again, the seal gap 60 has to be rechecked using feeler gauges. These steps have to be repeated as necessary until the required seal gap 60 is achieved, and then the upper plate 7 to the body 9 has to be fastened with the upper plate fasteners 66.

As will be appreciated, this process is time consuming and can be physically demanding if the valve is large and therefore heavy. Furthermore, the inflatable seal 47 may be damaged in the process of removing from the assembly, for example when placing on the ground.

Figure 4:
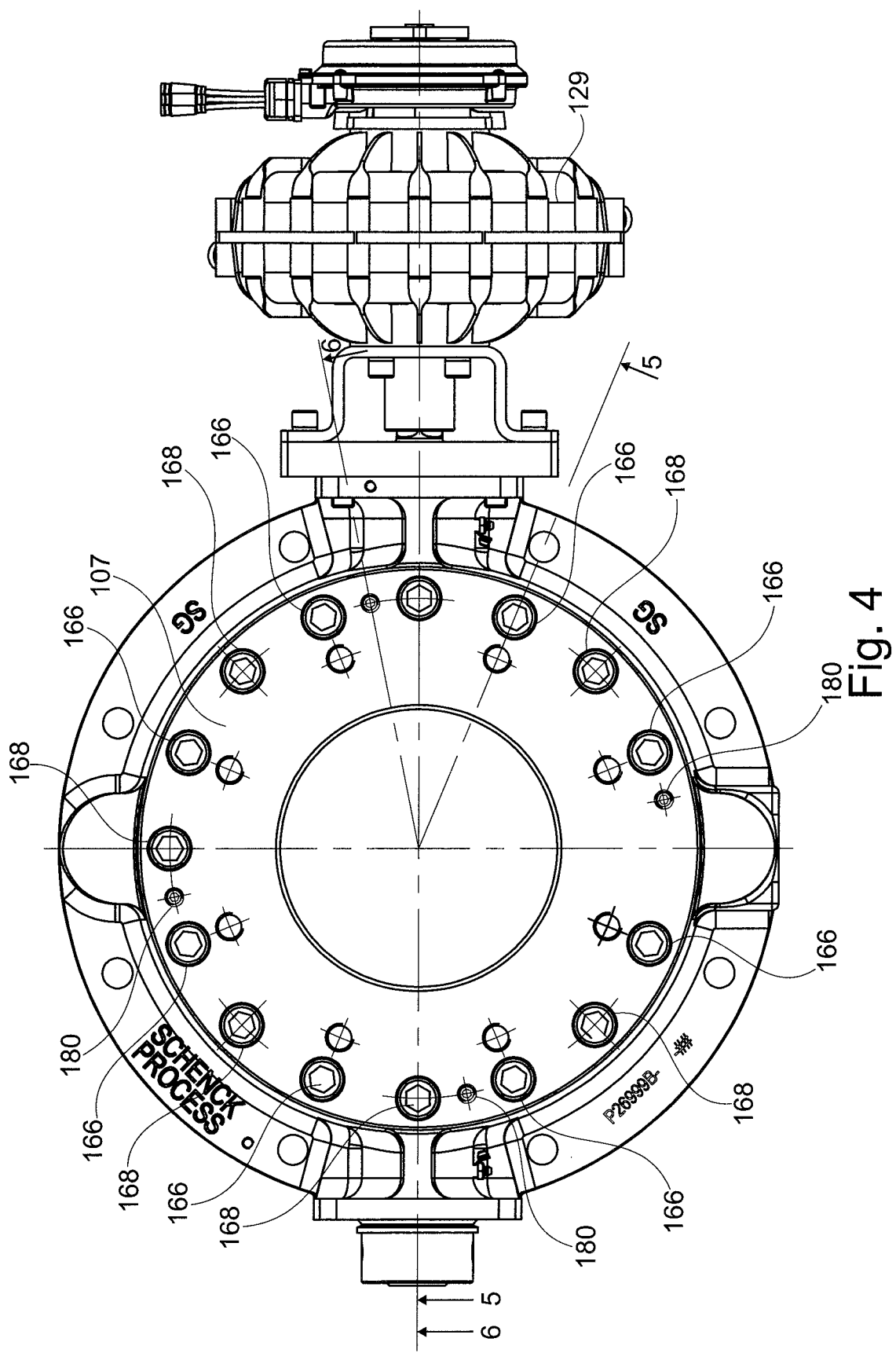
FIG. 4 is a top view of an embodiment according to the present invention, showing a new upper plate design and valve body fasteners according to an embodiment of the present invention.

FIG. 4 shows a top view of an embodiment of the valve 101 of the present invention. Upper plate fasteners 166 and valve body fasteners 168 are arranged circumferally around axis 157.

Figure 5:
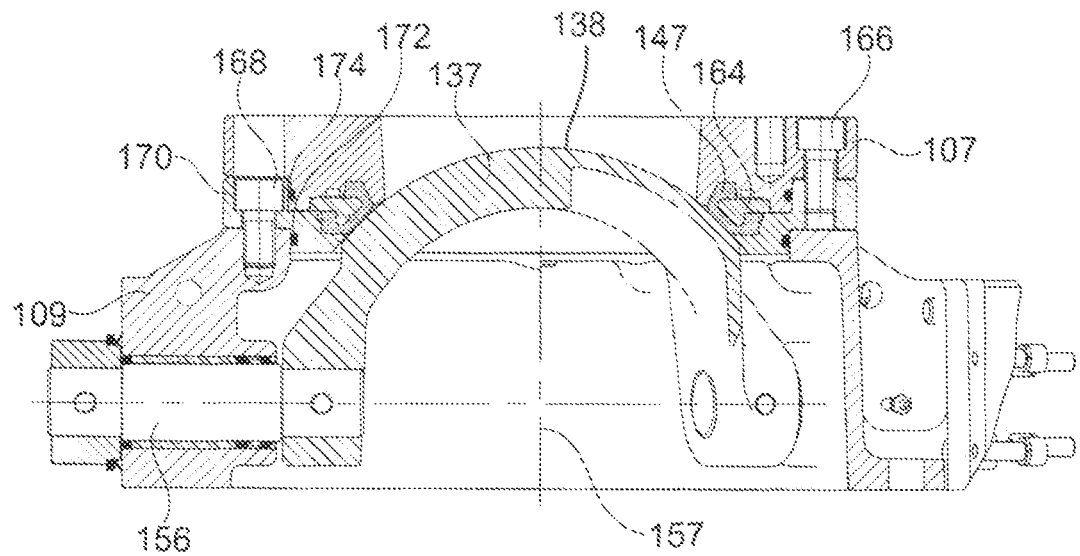
FIG. 5 is a cross-sectional view of the embodiment shown in FIG. 4 along the section line A-A, showing a new upper plate design, valve body, valve closure member, insert ring, sealing ring, seals, intermediate plate, and valve body fasteners according to an embodiment of the present invention.
Figure 6:
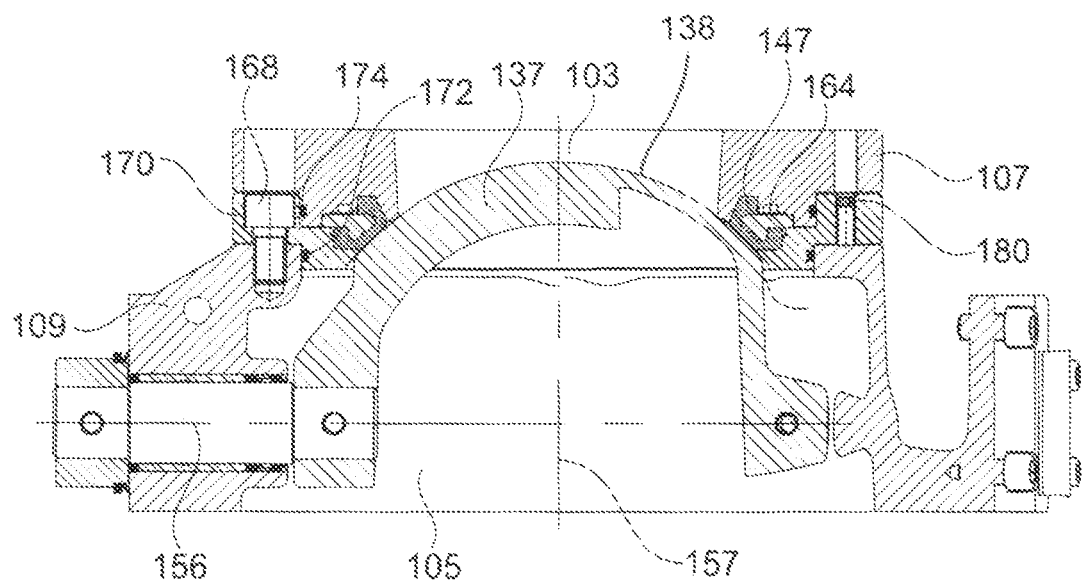
FIG. 6 is another cross-sectional view of the embodiment shown in FIG. 4 along the section line B-B, showing amongst other items, the new upper plate design and the adjustors.

FIGS. 5 and 6 show cross sections of embodiments of the valve 101 shown in FIG. 4, where the closure member 137 is in its closed position. Features in common with valve 1 are provided with like reference numerals incremented by 100.

FIGS. 5 and 6 show a similar valve to the valves described in FIGS. 1-3, however the valve 101 does not comprise gasket shims 62, used to adjust the circumferential gap 160.

Figure 7:
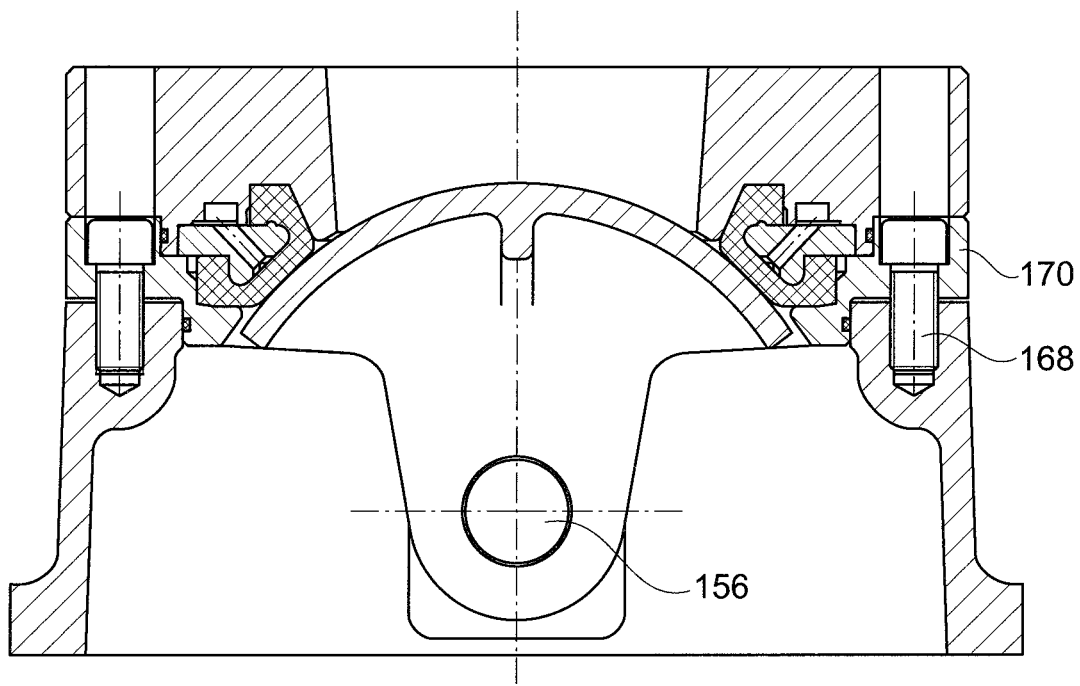
FIG. 7 is a cross-sectional view of the embodiment shown in FIGS. 5 and 6, rotated 90 degrees about the vertical axis.
Figure 8:
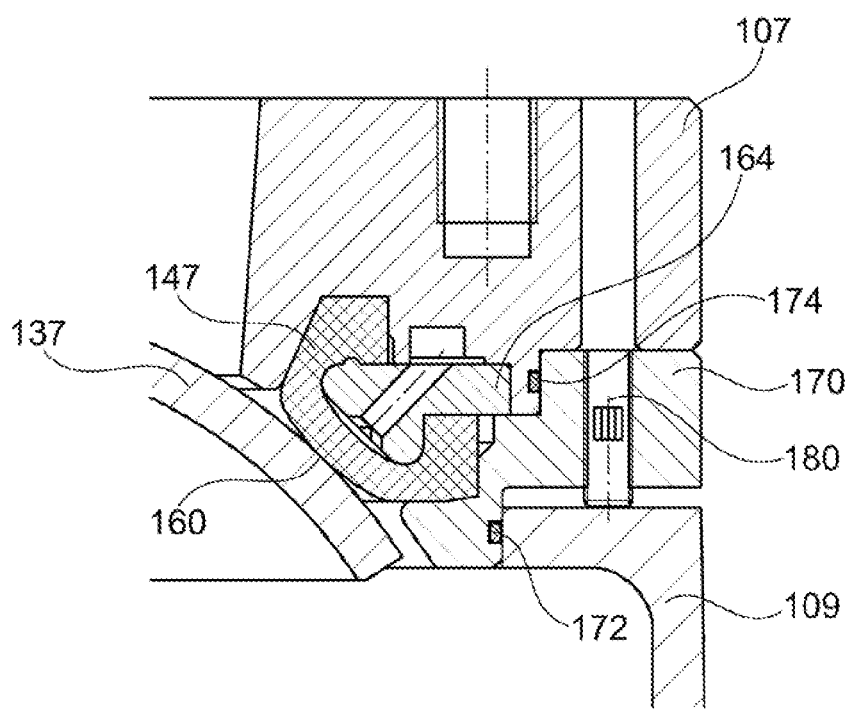
FIG. 8 is a detailed view of the sealing ring shown in the first configuration (inflated).

Instead, the valve 101 comprises a plurality of movable adjustors 180, which are used to adjust the size of the circumferential gap, 160 (see FIGS. 7 and 8). Furthermore, the valve 101 comprises an insert ring 164, an intermediate plate 170, a plurality of valve body fasteners 168, and a plurality of seals 172,174.

The intermediate plate 170 is attached to the valve body 109 via the plurality of valve body fasteners 168 and is attached to the valve upper plate 107 via the plurality of upper plate fasteners 166. Both sets of fasteners 166, 168 may be arranged in circular patterns which are offset relative to each other around the longitudinal central axis 157 of the valve 101. The offset ensures access to the valve body fasteners 168 through the valve upper plate 107, enabling the intermediate plate 170 to be detached from the valve body 109 without removing the upper plate 107. There may be a plurality such as 4 to 24 upper plate fasteners 166 and a plurality of such as 4 to 24 valve body fasteners 168. The fasteners may, for example, be about M12 to M36 screws.

The intermediate plate 170 houses the plurality of movable adjustors 180. There may be a plurality such as 4 to 12 movable adjustors 180, which are also arranged in a circular pattern about the longitudinal central axis 157 of the valve 101. The movable adjustors 180 are accessible through the valve upper plate 107, therefore the valve 101 does not need to be disassembled to adjust the circumferential seal gap 160. The adjustors 180 may be screws, ranging in size from about M8 to M27. With the valve body fasteners 168 loose, the movable adjustors 180 as shown in FIG. 6, are screwed in or out of the intermediate plate 170 thereby protruding onto the valve body 109 by varying distances, thus controlling the distance between the valve body 109 and the intermediate plate 170.

FIGS. 5 and 6 also show the plurality of seals 172, 174, which are usually O-rings. A seal 172 is provided between the intermediate plate 170 and the valve body 109, and a seal 174 is provided between the intermediate plate 170 and the upper plate 107. These seals may be in different locations from the locations shown in the figures, and there also may be more than one seal between each component of the valve 101.

This arrangement allows the seal gap 160 to be set, for example, as follows: With the closure member (dome) 137 in the closed position, and the resilient/inflatable seal 147 in its second/deflated configuration, feeler gauges are used to measure the circumferential seal gap 160 between the closure member sealing surface 138 and the inflatable seal 147. If the gap is too big the seal gap 160 is reduced by turning the adjusting fasteners 180 anti-clockwise. If the gap is too small the seal gap 160 is increased by turning the adjusting fasteners 180 clockwise. The valve body fasteners 168 securing the intermediate plate 170 to the valve body 109 are loosened.

A tool is then used to turn the adjustors 180 to give the required seal gap 160. The gap 160 is then checked with feeler gauges.

With the seal gap 160 set, the valve body fasteners 168 securing the intermediate plate 170 to the valve body 109 are re-tightened.

The feeler gauges can be inserted at various locations around the circumference of the resilient seal 147, to ascertain the size of the gap. The valve body fasteners 168 in step 2 may be removed from the assembly if loosening is not sufficient to adjust the movable adjustors 180. The plurality of movable adjustors 180 must be adjusted in a similar way, to ensure the intermediate plate 170 and the valve body 109 stay aligned to each other along the longitudinal central axis 157. Ideally, the intermediate plate 170 and the connected components should be displaced at a right angle along the central axis 157 from the valve body 109 to ensure a consistent circumferential gap 160 between the convex sealing surface 138 and the sealing ring 147.

As can be appreciated, the method above is beneficial to the user as all of the fasteners 166, 168 and movable adjustors 180 can be accessed through the upper plate 107, and the upper plate 107 does not need to be removed to adjust the circumferential seal gap 160. The new design allows the seal gap 160 to be set in less time when compared to valves in the prior art. When maintenance on large valves 101 is carried out, components such as the upper plate, 107 can be heavy and cumbersome to remove. The new design therefore also requires less physical effort to set the seal gap 160, since the upper plate 107 does not need to be removed.

A further benefit of the new design is manifested during valve maintenance, as the resilient sealing ring 147 can be accessed by removing the valve upper plate 107 only. When the valve upper plate 107 is removed both the sealing ring 147 and the retaining ring 164 can be lifted clear of the intermediate plate 170. No fixings are used to hold the sealing ring 147 and retaining ring 164 to the intermediate plate 170. The sealing ring 147 wraps around the retaining ring 164 as the sealing ring 147 is produced from a flexible rubber compound.

This is beneficial as it allows the intermediate plate 170 to stay in the same position, therefore keeping the 'factory set' circumferential seal gap 160.

The new adjustable design may be retrofitted to existing valves, allowing existing users to benefit also.

In FIGS. 5 and 6, the valve comprises a valve upper plate 107, an intermediate plate 170, and a body 109, however the invention disclosed could also work if there was no intermediate plate 170, and the resilient sealing ring 147 was attached directly or indirectly to the upper plate 107. This configuration would result in only one set of fasteners to assemble the valve, attaching the valve upper plate 107 to the valve body 109.

FIG. 7 is a cross-sectional view of the embodiment shown in FIGS. 5 and 6, rotated 90 degrees about the vertical axis. The transverse axis 156 is orientated into the page and the closure member 137 rotates about this axis, moving between the open and closed positions.

FIG. 8 shows is a detailed view of the sealing ring 147 shown in the first configuration (inflated), with the seal gap 160 exaggerated for clarity.

Figure 9:
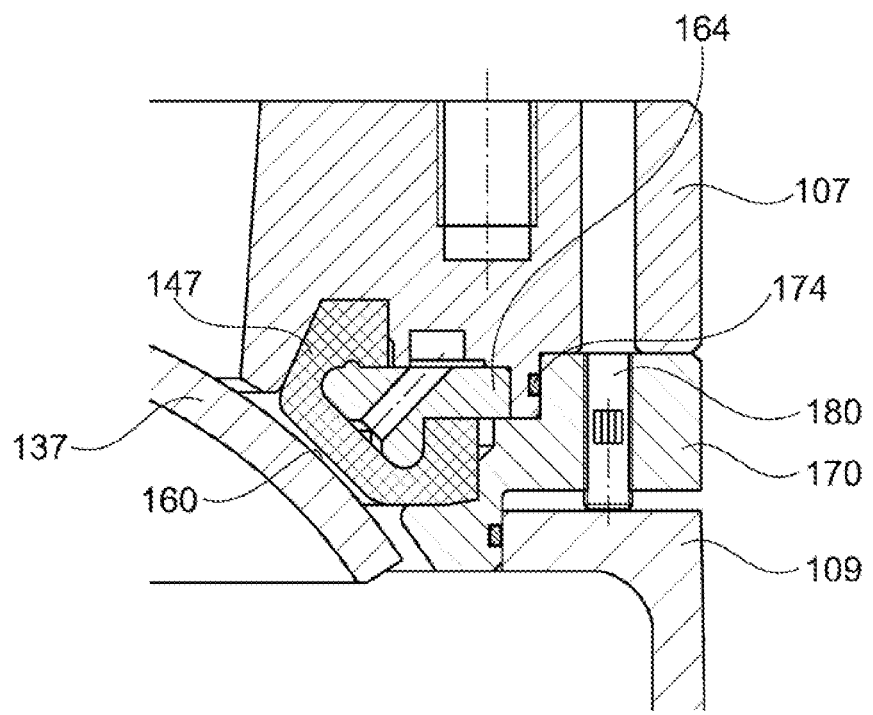
FIG. 9 is a detailed view of the sealing ring shown in the second configuration (deflated).

FIG. 9 is a detailed view of the sealing ring 147 shown in the second configuration (deflated), with the seal gap 160 exaggerated for clarity.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method of adjusting a circumferential gap between a convex sealing surface and a resilient inflatable sealing ring of a valve, the valve comprising a valve upper plate defining an inlet, valve body defining an outlet, and a fluid passage extending between the inlet and the outlet, a closure member having the convex sealing surface and being disposed in the fluid passage, the sealing ring being attached to the valve upper plate and extending around the fluid passage, and, when the closure member is in a closed position, the sealing ring is moveable between a first configuration in which the sealing ring forms a seal around a circumference of the convex sealing surface and a second configuration in which there is the circumferential gap between the convex sealing surface and the sealing ring, and a plurality of movable adjustors, wherein the plurality of movable adjustors are movable to adjust or define a size of the circumferential gap between the convex sealing surface and the sealing ring, the method comprising:

measuring the circumferential gap between the convex sealing surface and the sealing ring to obtain a measurement of the circumferential gap; and rotating the plurality of movable adjustors such that the plurality of movable adjustors protrude out from the valve upper plate and onto the valve body in a direction towards the outlet by varying distances to displace the valve upper plate from the valve body thereby adjusting the size of the circumferential gap.

2. The method according to claim 1, wherein the plurality of adjustors are rotated via through-holes arranged in the valve upper plate without removing the valve upper plate from the valve body.

3. The method according to claim 1, wherein before rotating the plurality of movable adjustors, a plurality of upper plate fasteners are loosened to allow the valve upper plate to be displaced from the valve body.

4. A kit of parts for a valve comprising:

a valve upper plate defining an inlet, the valve upper plate housing a resilient sealing ring and the valve upper plate being attached onto a valve body defining an outlet;

a closure member disposed in a fluid passage between the inlet and the outlet, the closure member having a convex sealing surface, wherein the valve upper plate has openings arranged in a circular pattern with fasteners inserted therein to attach the valve upper plate to the valve body, and the valve plate having further openings with a plurality of movable adjustors inserted therein, wherein the plurality of adjustors are movable to adjust a size of a circumferential gap between the convex sealing surface and the sealing ring, and wherein to adjust or define the size of the circumferential gap, the at least two movable adjustors are rotated such that the at least two movable adjustors protrude out from the valve upper plate and onto the valve body in a direction towards the outlet by varying distances to displace the valve upper plate relative to the valve body.

5. A valve comprising:

a valve upper plate having an inlet;

a valve body having an outlet;

a fluid passage extending between the inlet and the outlet;

a closure member disposed in the fluid passage between the inlet and the outlet, the closure member having a convex sealing surface, and the closure member being rotatable between a closed position in which the closure member extends across the fluid passage with the convex sealing surface oriented towards the inlet and an open position in which fluid is able to flow through the fluid passage from the inlet to the outlet;

a resilient sealing ring attached to the valve upper plate and extending around the fluid passage, and, when the closure member is in the closed position, the sealing ring is moveable between a first configuration in which the sealing ring forms a seal around a circumference of the convex sealing surface and a second configuration in which there is a circumferential gap between the convex sealing surface and the sealing ring; and at least two movable adjustors, wherein the at least two movable adjustors are movable to adjust or define a size of the circumferential gap between the convex sealing surface and the sealing ring, wherein to adjust or define the size of the circumferential gap, the at least two movable adjustors are rotated such that the at least two movable adjustors protrude out from the valve upper plate and onto the valve body in a direction towards the outlet by varying distances to displace the valve upper plate relative to the valve body.

6. The valve according to claim 5, wherein the sealing ring is attached to the valve upper plate via an insert ring.

7. The valve according to claim 5, wherein the at least two movable adjustors are rotated without removing the valve upper plate.

8. The valve according to claim 5, wherein the sealing ring comprises an inflatable portion which in use is pressurized and depressurized to facilitate movement of the sealing ring between the first and second configurations.

9. The valve according to claim 5, wherein the valve upper plate is attached to the valve body with a plurality of upper plate fasteners, and wherein the at least two movable adjustors are located inside the valve upper plate.

10. The valve according to claim 5, wherein the valve further comprises an intermediate plate located between the valve body and the valve upper plate, and wherein the at least two movable adjusters are located in the intermediate plate.

11. The valve according to claim 10, wherein the valve upper plate is attached to the intermediate plate with a plurality of upper plate fasteners, and the intermediate plate is attached to the valve body with a plurality of valve body fasteners.

12. The valve according to claim 11, wherein the intermediate plate comprises a plurality of seals, wherein at least one of the plurality of seals is located between the intermediate plate and the valve upper plate, and at least another one of the plurality of seals is located between the intermediate plate and the valve body.

13. The valve according to claim 5, wherein the at least two movable adjustors are grub screws.

14. The valve according to claim 5, wherein the at least two movable adjustors are accessible through the valve upper plate.

15. The valve according to claim 5, wherein the at least two movable adjustors directly contact the valve body.

* * * * *